Patented Oct. 2, 1934

1,975,398

UNITED STATES PATENT OFFICE 1,975,398

PROCESS FOR THE MANUFACTURE OF MOLDING SAND, AS USED FOR MAKING CORES AND FLASK MOLDING, FREE AND TEMPLATE MOLDINGS

Jean Amédée Malaspina, Vitry-sur-Seine, France

No Drawing. Application August 17, 1932, Serial No. 629,187. In France August 25, 1931

3 Claims. (Cl. 22—188)

The invention relates to the manufacture of a molding sand obviating the difficulties met by the usual means and methods employed in making cores and molds with mixtures, the main constituent of which is sand.

Whereas in actual casting art, white sand enters but for a part in the manufacture of molds, according to the present invention, I use siliceous white sand for all parts of molds, notwithstanding that, in case of want of such siliceous white sand, any kind of common sand or ordinary molding sand may be used without departing from the spirit of my invention.

I also use, for the composition of my molding mixture, substances or ingredients already used in the art, but I use them in quite a different way, forming the main object of my invention.

Besides, an important feature of my invention resides in the addition to the mixture of substances or ingredients that have heretofore never been used in the manufacture of molding sand, these substances being added in view of promoting, causing and insuring the quick and complete setting and hardening of the mixture used to make the molds.

The mixture according to my invention may be used for making molds in closed or built up flasks and cores, also for free and template molding.

The molding sand according to my invention is made of a mixture of white sand and hydraulic lime to which I preferably add quicklime as moisture absorber, flake white as agglomerating agent, Glauber salt or sodium chlorate, or potassium chlorate or sulphate or any other substance or substances acting so as to accelerate the hardening of the composition, and further potash or soda, potassium or sodium carbonate as scouring means, lastly sodium silicate as agglutinating agent.

The following is an example of a mode of carrying out the manufacture of the molding sand forming the object of my invention:

The white sand to be used should preferably be fine grained siliceous sand such as is extracted from the Rhone or the River Marne, to which is added 5% of white sand from Namur. Any other available white sand may however be used, whatever be its grain. The sand is used damp, not dried, as taken from the heap. To said white sand mixture, the following substances are added, thoroughly sieved so as to be quite free from any foreign matters; the named substances are those that in all cases, insure the best results with greatest economy.

To 50 litres of aforesaid sand mixture, I add: 12 litres of hydraulic lime, 1 litre of quick lime, ½ litre of flake white, 250 grammes of Glauber salt, 250 grammes of potash or soda, 125 grammes sodium silicate dissolved in 4 to 8 litres of water.

In order that the importance, purpose and action of each of the aforesaid substances should be well understood, the reason of their choice and their behavior during the different processes of mixing, molding, lifting of the pattern, curing, pouring, lifting of the casting and recuperation of the sand will now be explained:

Siliceous white sand is preferably selected because it contains no clay which, when rammed, causes in the molds irregularities which are the chief causes of fissures or cracks in the castings; white sand is besides cheaper and everywhere available; it also mixes very easily with water and lime.

Hydraulic lime, combining with moistening water produces the agglomeration or binding of the sand grains.

Quick lime hastens the drying and increases the agglomerating power.

Glauber salt accelerates the hardening of the mixture. This Glauber salt, for which may be substituted sodium chlorate, or potassium sulphate or chlorate acts therefore as catalyst in hastening the chemical reactions between water and lime, so promoting the hardening of the mixture.

The sodium silicate, which is an agglutinating agent, assists the binding of the mixture.

Flake white promotes the binding of the whole by coating the sand grains with a very thin and soft film facilitating the sticking of the lime to them.

Potash or soda is intended to clean and scour the sand grains in order to facilitate the sticking of flake white thereto and so insure the agglomerative homogeneousness throughout the mixture.

The above named substances are mixed and stirred for about 15 minutes. The mixing process makes the potash or soda scour the sand grains so that flake white will adhere thereto and distributes all the substances throughout the mass.

The mixture is employed just as it is. Before dumping in them the sand, all frames, patterns and core boxes are preferably powdered with flake white; the sand is then rammed by any usual hand or mechanical means.

Common or built up flasks may be used, which can be withdrawn when the molds are in place and ready for pouring, because the rammed and set mixture holds very well without supports. Armatures, braces or frames of cast are, when necessary, placed in the molds or cores, but these braces will always be much lighter, simpler and scarcer than in molds made of ordinary molding sand.

Excess of ramming of the mixture in the molds does no harm, first because the white sand rams tightly but with difficulty, and secondly because the hardness of the molds does not depend only on the ramming grade of the sand as in ordinary processes. The ramming can therefore be done by workers less trained in the art of precise ramming. Even with clayish sand, an excess of ramming will not be prejudicial, by reason of the presence of lime.

The lifting of the patterns or core boxes is quite easy, because the mixture according to the invention never sticks to them, mainly because the ramming of the sand does not sweat water against the patterns. Less breakages occur therefore in the molding surfaces, which reduces the flush jointing work. Any mold or core made according to the present process may thus be readily repaired or flush-jointed.

Immediately after lifting the patterns, the surface of the mold is spread all over with a glaze preferably composed of 3 litres of hydraulic lime, 1 litre of flake white, 400 to 500 grammes of Glauber salt and 4 to 6 litres of water.

When manganese steel is intended to be cast, 50 to 60 grammes of manganese dioxide are added to this glaze. This glaze is laid by means of a soft brush or is pneumatically sprayed. Its main purpose is to fill all the pores of the molding surfaces and impart to them a glazing which makes them very smooth. While curing, molds and cores are laid exposed to free air on the floor of the works, for 10 to 18 hours according their size.

When lifting the patterns, the sand is damp and plastic, while curing, the consistency of the sand in the molds becomes progressively harder, because the lime combining with water in presence of the sand, hardens and crystallizes so that, after drying, there remains no free water and the cores and molds are uniformly hardened throughout their mass; the surfaces and their nearest layers are however noticeably harder.

The drying takes place not through evaporation, but by chemical combination of water and lime. The Glauber salt acts on the moistened lime to make it set and harden very rapidly. The same effect is produced to a lesser extent by sodium chlorate or potassium sulphate or chlorate or other chemicals, singly or in combination. The employment of such agents allows therefore the use of the cores and molds after a much shorter time following their manufacture. The admixture of Glauber salt in the coating or glaze has the effect of accelerating the setting of the mixture all over the molding surfaces and in the neighboring inner layers and to produce the glazing of these surfaces.

Great savings of fuel, labor and sand result from the fact that the molds and cores need not be dried in an oven. Furthermore the molds, cores, etc., keep strictly their shapes and dimensions, they do not settle, bend nor sag, and need no wedging, no propping, nor supports of any kind.

After curing the molds and cores can be kept indefinitely because they have acquired a great hardness, all through, their edges are sharp and their thin parts do not break, being very strong. A chief feature of the molds and cores, etc., made with the sand according to the invention is that moisture does not penetrate into them, even when exposed to unfavorable climatic or atmospheric conditions.

When water is splashed onto their surfaces it penetrates only very little and with difficulty; it produces no swelling, nor disintegrating nor scaling of the sand. This is not only on account of the resistance offered by the dried glazing to humidity, but also from the fact that the pores between the sand grains are filled with hydrated lime which absorbs water very slowly.

Since the molds and cores are very strong, they may be readily lifted and manipulated without breaking nor sagging during the successive molding processes. It is possible to hollow out the cores, without reducing their strength, making holes and notches which are then filled with powdered coke or burnt sand so that the cores give way, break and disintegrate under the considerable pressure produced by the shrinking metal after its solidification, so that no cracks occur in the cast pieces.

For complicated cores, the aforesaid mixture may have added to it: about 2 litres of chopped flax straw, 1 litre of fine sieved dry horse dung, 1 litre of bran. After the casting operation, the heat generated from the metal burns these substances and the destruction of the cores is thus further accelerated and their stripping is facilitated.

During pouring all parts of the molds and cores withstand perfectly well the flow and pressure of the molten metal, because the molding surfaces are very hard and the edges and thin parts very strong so that they do not disintegrate.

Since the mold surfaces are glazed and smooth, the metal flows freely and completely fills the narrow spaces and follows the sharp edges. This is due to the glazing produced by the Glauber salt in the coating and also to the pickling action of the potash or soda on the molten metal, so that it never sticks to the sand.

Since the surfaces are very smooth, the molten metal gets no hold on the sand grains; on the other hand, the shock of the flowing metal does not sweep off these grains because they are strongly agglomerated together by the flake white and the lime.

By reason of the nature of the substances employed for the manufacture of the molds and cores, and because there is no moisture, no gas nor steam is generated during the pouring.

No bubbling is to be noticed in the vent or tap holes. Neither is it necessary to set afire the gases around the molds. A mirror or a cold metal plate placed over a vent hole during the pouring shows only a slight mist, but absolutely no dampness nor condensed water. No smoke, no disagreeable smell, no poisonous nor eye injuring gas are generated.

When the mold is filled, the consistency and physical state of its walls undergo a peculiar transformation by reason of their sustained contact with the hot metal. At the surface, the sand is formed into a hard crust, 3 to 6 millimetres thick, which keeps securely the shapes until the metal is solidified. Immediately behind this crust, and for a depth varying from 1 to 4 centimetres, according to the amount of heat generated from the casting, the sand is completely disintegrated, loses its cohesion and becomes quite powdery. Beyond this zone, the material of the mold keeps its original consistency, cohesion and strength.

As regards the cores, since they are surrounded by the hot metal, the heat conducted therefrom goes right through to the heart of the sand mass and causes it all to become powdery. That part of sand in close contact with the hot metal is formed into a hard crust by the sudden action of heat at a high temperature: very rapidly indeed occurs a slight vitrification of the lime in the presence of sand and a small amount of silicate of soda; the sheet or layer of sand subjected to this high temperature acquiring a great hardness and cohesion; this crust, though brittle is not friable. Beyond this crust, the mixture is still subjected to the action of a strong heat but of a temperature insufficient to cause the vitrification of the lime.

The sudden drying effect produced in this further layer, crackles the lime, disintegrates it and destroys its function as main agglomerator. The mixture is therefore in this layer brought to a powdery state.

Beyond this second layer, the heat is no more sufficient in intensity and quantity to destroy or change the hardness of the mixture which therefore keeps its cohesion and remains homogeneous.

When removing the casting and the frames, since the lifted casting is surrounded with powdery sand, deprived of cohesion and strength, the mold is immediately broken to pieces and the casting is readily freed. Any part of the crust remaining held to it is readily separated by a sharp hammer blow on the casting.

Repeated blows on the casting cause the flowing out, through the stripping holes, of the sand forming the cores; their crust being broken into very small pieces able to pass through small apertures.

Low pockets from which the sand cannot escape by its own weight are easily emptied by blowing with compressed air. Since the core bars and braces are light, they may be easily twisted and withdrawn.

The pickling effect of potash or soda acting through the glazing is the chief reason why the mold does not adhere or stick to the casting which shows a finely colored and very smooth surface owing to the glazing imparted to the mold surfaces by the Glauber salt.

The percentage of reclaimed mixture is very high. The reclamation is very fast and easy because the useless parts remaining as bits or plates of crust and powdery sand are well separated from the serviceable ones which remain in the state of lumps or blocks.

These reclaimed parts are ground and mixed with water; when their setting lessens or is too slow, adequate quantities of the aforesaid substances may be added to them.

The benefits furnished by the molding sand according to my invention are principally as follows:

The molding time is considerably reduced relative to common practice, and no special workers are required to do it. The sand does not stick to the patterns, the molds and cores need not be oven dried or baked, all their parts keep their shapes and dimensions; the mixture according to the invention forms very hard molds and cores, sufficiently strong to withstand the shocks of the flowing molten metal and the pressures due to its weight, but the resistance of the mold is not so great as to hinder the free shrinking of the metal; fractures or cracks of the casting are thus obviated, without provision of the usual shrinkage holding ribs.

When the curing is effected, the molds can be kept for long periods of time, do not absorb moisture and are not damaged by water splashing on them since it penetrates but little and dries very quickly.

Even when the mixture is subjected to excessive ramming, no flows or pin holes or pittings ever occur, because, when the mixture is hardened, it contains no moisture or substances that can generate steam or gases under the action of heat.

The air holes are needless because no bubbling or blowing of liquid metal ever occurs, nor burning gases, steam or smoke; neither evolves any bad smell, nor poisonous gases, nor eye injuring gases.

The metal flows very easily in the molds, fills them quickly and gives very sharp edged pieces of work. The sand does not stick to the cold metal which shows a smooth and fine surface.

During cooling, the layer of sand contacting with the casting is transformed into a thin hard crust, immediately behind which a layer of the mold disintegrates all around the casting and the cores become powdery, therefore the removal of the castings and the emptying of cored holes are made much easier.

The percentage of reclaimed sand is very high and this reclamation is easy because the useless parts are left in the form of bits of crust and powdered sand that are readily separable from the useful parts left as blocks or lumps.

Having now described my invention and in what manner it must be performed as regards the most efficient proportions of substances employed, explained their action and stated the benefits resulting from the use of this sand in every phase of its working,

I claim:

1. A composition of matter to be used for making cores and flask molds, free and template moldings, and comprising: a mixture of white siliceous sand with hydraulic lime to which are added quick lime, flake white, Glauber salt, an alkali metal carbonate, sodium silicate and water.

2. A composition of matter to be used for making cores and flask molds, free and template moldings, and comprising: for 50 litres of siliceous white sand, 12 litres hydraulic lime, 1 litre quick lime, ½ litre flake white, 250 grammes Glauber salt, 250 grammes an alkali metal carbonate, 125 grammes sodium silicate dissolved in 4 to 8 litres water.

3. A composition of matter to be used as molding sand comprising white siliceous sand, hydraulic lime, quick lime, flake white, Glauber salt, an alkali metal carbonate, aqueous solution of sodium silicate in the proportions stated in claim 2 to which are added: 2 litres chopped flax straw, 1 litre finely sieved dry horse dung and 1 litre bran.

JEAN AMÉDÉE MALASPINA.